United States Patent
Phillips (10) Patent No.: US 12,146,331 B2
(45) Date of Patent: Nov. 19, 2024

(54) PORTABLE BASE COVER

(71) Applicant: Hunter Phillips, Fort Lauderdale, FL (US)

(72) Inventor: Hunter Phillips, Fort Lauderdale, FL (US)

(*) Notice: Subject to any disclaimer, the term of this patent is extended or adjusted under 35 U.S.C. 154(b) by 0 days.

(21) Appl. No.: 18/016,433

(22) PCT Filed: Jul. 16, 2021

(86) PCT No.: PCT/US2021/042034
§ 371 (c)(1),
(2) Date: Jan. 16, 2023

(87) PCT Pub. No.: WO2022/016090
PCT Pub. Date: Jan. 20, 2022

(65) Prior Publication Data
US 2023/0287700 A1 Sep. 14, 2023

Related U.S. Application Data (60) Provisional application No. 63/052,507, filed on Jul. 16, 2020.

(51) Int. Cl.
*A47G 7/08* (2006.01)
*E04H 12/22* (2006.01)

(52) U.S. Cl.
CPC .......... *E04H 12/2238* (2013.01); *A47G 7/08* (2013.01)

(58) Field of Classification Search
CPC ... E04H 12/2238; E04H 12/2269; A47G 7/08; A01G 13/0281; B65D 11/10; B65D 11/188; B65D 11/00
See application file for complete search history.

(56) References Cited

U.S. PATENT DOCUMENTS

| | | | |
|---|---|---|---|
| 6,256,961 B1 | 7/2001 | Byrns | |
| 6,257,557 B1 | 7/2001 | Anderson et al. | |
| 7,972,026 B2* | 7/2011 | Warner | F21V 17/164 362/431 |
| 2009/0236579 A1* | 9/2009 | Sudnak | E04H 12/2292 52/835 |
| 2009/0261215 A1* | 10/2009 | Lambert | A61M 5/1415 248/346.5 |

* cited by examiner

*Primary Examiner* — Don M Anderson
(74) *Attorney, Agent, or Firm* — Johnson | Dalal; Mark C. Johnson (57) ABSTRACT

A portable base cover that includes at least two substantially rigid body sections each with a rear sidewall, two opposing sidewalls flanking and extending away from the rear sidewall and having side terminal surfaces, and an upper wall extending away from the rear sidewall and having an upper wall side terminal surface with a recessed portion defined thereon and forming, with the side terminal surfaces, a perimeter section surface, wherein the body sections are operably configured to adjacently and removably couple together about their respective perimeter section surfaces to form a substantially closed configuration, form a tightly-spaced joint between each of the respective perimeter section surfaces, and to define an enclosed base covering cavity spatially coupled to an enclosed protrusion aperture defined by recessed portions defined by the upper walls of the body sections.

17 Claims, 7 Drawing Sheets

PORTABLE BASE COVER

FIELD OF THE INVENTION

The present invention relates generally to structural base covers, and, more particularly, relates to portable base covers for plants, umbrellas, or other similar pole-like or upright structures.

BACKGROUND OF THE INVENTION

Many known plant and umbrella bases are aesthetically unappealing, cause inadvertent debris to emit therefrom, and can be unsafe for individuals such as children. More specifically, many users utilize bases to retain vertically upright structures, such as plants, coat racks, umbrella stands, etc. The integrity and security of theses bases retaining the upright structures is paramount to many users. Using plants by way of example, many users have plants housed within their homes, where errant debris could be harmful to the floors in said homes and/or for children and/or pets within said homes. The likelihood of harming children and pets is increased when these plants utilize chemicals or additives designed to help said plants grow.

Most known devices configured to address the above-described problems include sectioned covers that are only configured to be placed over and/or directly coupled to the top of the base retaining the upright structure. These covers still fail to protect against tipping of the upright structure and inadvertent contact of the base that may cause the tipping and/or inadvertent removal of debris from the base. Similarly, some known devices include flexible bags that are configured to enclose and/or partially encapsulate the base, but said bags still suffer from the same disadvantages as the above-referenced covers.

Therefore, a need exists to overcome the problems with the prior art as discussed above.

SUMMARY OF THE INVENTION

The invention provides a portable base cover that overcomes the hereinafore-mentioned disadvantages of the heretofore-known devices and methods of this general type and that effectively, safely, and efficiently covers a base designed to retain an upright structure, such as a plant or umbrella. Specifically, the invention described herein provides a plant and umbrella base cover that overcomes known disadvantages of those known devices and methods of this general type and that effectively, efficiently, and safely covers a base structure for plants, umbrellas, or other similar pole-like or upright structures. Said another way, the invention is essentially a practical piece of furniture with two functionalities, or applications, in its current state. The two applications have the same core idea and are of identical design; the first of which is intended to be used as a plant pot covering ("plant application") and the second of which is intended to be used as an umbrella stand covering ("umbrella application").

With the foregoing and other objects in view, there is provided, in accordance with the invention, a portable base cover with at least two substantially rigid body sections (or a first and a second body section) each with an upper end, a lower end opposing the upper end, a rear sidewall, two opposing sidewalls flanking and extending away from the rear sidewall and having side terminal surfaces, and an upper wall extending away from the rear sidewall and having an upper wall side terminal surface with a recessed portion defined thereon and forming, with the side terminal surfaces, a perimeter section surface, wherein the at least two substantially rigid body sections are operably configured to adjacently and removably couple together about their respective perimeter section surfaces to form a substantially closed configuration, form a tightly-spaced joint between each of the respective perimeter section surfaces spanning from the lower end to the upper end, and to define a base covering cavity enclosed by the rear sidewall and two opposing sidewalls of the at least two substantially rigid body sections and spatially coupled to an enclosed protrusion aperture defined by recessed portions defined by the upper walls of the at least two substantially rigid body sections.

In accordance with a further feature of the present invention, the two opposing sidewalls and the upper wall extending away from the rear sidewall at a substantially perpendicular orientation.

In accordance with an additional feature of the present invention, the recessed portion is of an arcuate shape and the enclosed protrusion aperture forms a circular aperture defining a diameter ranging from approximately 25-250 mm.

In accordance with another feature, an embodiment of the present invention includes the substantially closed configuration of the at least two substantially rigid body sections having at least one fastener operably coupled to one of the two opposing sidewalls on both the at least two substantially rigid body sections and at least one fastener operably coupled to another of the two opposing sidewalls on both the at least two substantially rigid body sections.

In accordance with yet another feature, an embodiment of the present invention also includes a first plurality of magnets coupled to the side terminal surfaces and the upper wall side terminal surface of one of the at least two substantially rigid body sections and a second plurality of magnets, of an opposing polarity to a polarity of the first plurality of magnets, coupled to the side terminal surfaces and the upper wall side terminal surface of another of the at least two substantially rigid body sections, wherein the first and second plurality of magnets are operably configured to magnetically retain the at least two substantially rigid body sections in the substantially closed configuration.

In accordance with a further feature of the present invention, the rear sidewall, the two opposing sidewalls, and the upper wall of the least two substantially rigid body sections are substantially planar. Further, the rear sidewall and the two opposing sidewalls of the least two substantially rigid body sections define the lower end and a lower support plane.

In accordance with yet another feature, an embodiment of the present invention also includes the rear sidewall and the two opposing sidewalls each having an inner surface of a planar orientation spanning from an inner surface of the upper wall to the lower end, the inner surfaces of the rear sidewall and the two opposing sidewalls defining the base covering cavity.

In accordance with a further feature, an embodiment of the present invention also includes the rear sidewall and the two opposing sidewalls each having at least one leg coupled to the lower end thereon and defining a lower support plane.

Also in accordance with the present invention, a portable base cover is disclosed that includes a first substantially rigid body section with an upper end, a lower end opposing the upper end, a rear sidewall, two opposing sidewalls flanking and extending away from the rear sidewall and having side terminal surfaces each with a magnet coupled thereto, and with an upper wall extending away from the rear sidewall and having an upper wall side terminal surface with a recessed portion defined thereon and forming, with the side terminal surfaces, a perimeter section surface. Additionally, the portable base cover includes a second substantially rigid body section with an upper end, a lower end opposing the upper end, a rear sidewall, two opposing sidewalls flanking and extending away from the rear sidewall of the second body section and having side terminal surfaces each with a magnet coupled thereto and of an opposing polarity to the magnets coupled to the side terminal surfaces of the two opposing sidewalls of the first body section, and with an upper wall extending away from the rear sidewall and having an upper wall side terminal surface with a recessed portion defined thereon and forming, with the side terminal surfaces, a perimeter section surface, wherein the first and second body sections are operably configured to adjacently and removably couple together about their respective perimeter section surfaces to form a substantially closed configuration with the first and second body sections magnetically retained together and defining a base covering cavity enclosed by the rear sidewall and two opposing sidewalls of the at least two substantially rigid body sections and spatially coupled to an enclosed protrusion aperture defined by recessed portions defined by the upper walls of the at least two substantially rigid body sections.

Although the invention is illustrated and described herein as embodied in a portable base cover, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the base, spanning from the lower end to the upper end thereon.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention. The drawings are not necessarily depicted to scale.

DETAILED DESCRIPTION OF THE INVENTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient assembly operably configured to allow users to utilize their pre-existing pots without having to repot them. Furthermore, for the plant application, the present invention provides an alternative to decorative pots. Additionally, the invention creates an aesthetically pleasing option for a potted plant, in addition to hiding dirt which a user typically sees with potted plants, preventing babies and dogs from digging or picking at dirt, allowing plants to be swapped easily while keeping the same aesthetic and could potentially help retain moisture.

For the umbrella application, the present invention creates a table compatible with an already existing umbrella and umbrella stand, in addition to making an umbrella set up more aesthetically pleasing, providing a small amount of storage inside the cube and providing extra reinforcement to help with the umbrella tipping. Although the invention is illustrated and described herein as embodied in a plant and umbrella base cover 100, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

Figure 1:
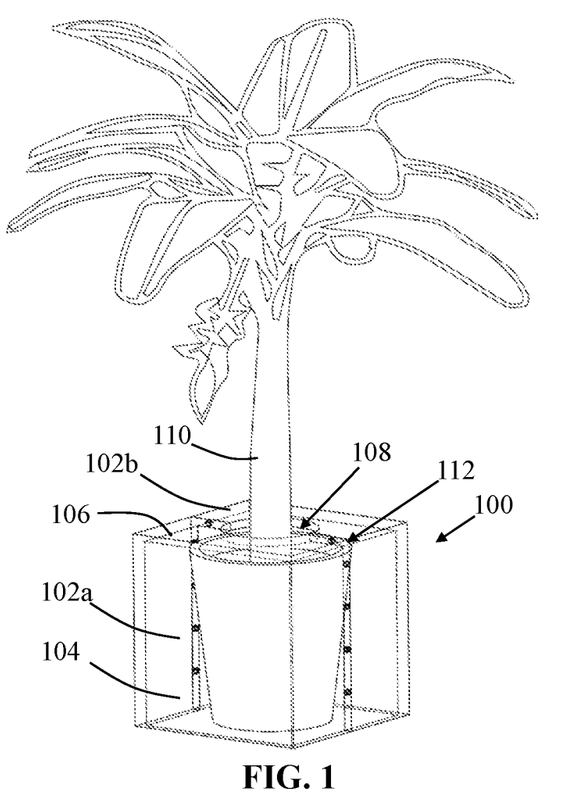
FIG. 1 is a perspective view of a plant and umbrella base cover housing a plant base and plant and in a substantially closed configuration in accordance with one embodiment of the present invention.
Figure 2:
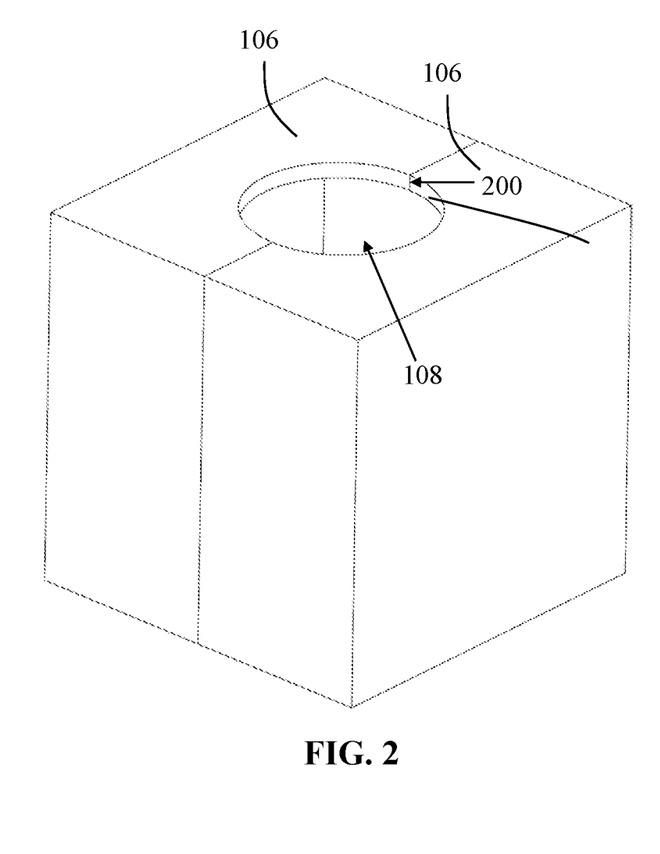
FIG. 2 is a perspective view of the base cover in FIG. 1.

Referring now to the figures, embodiments of the present invention are shown in various views. The figures show several advantageous features of the present invention, but, as will be described below, the invention can be provided in several shapes, sizes, combinations of features and components, and varying numbers and functions of the components. The first example of a plant and umbrella base cover 100, as depicted in FIG. 1, includes at least two substantially rigid body sections 102a-n that are operably configured to selectively couple and uncouple from one another to substantially cover a base structure of a plant (as depicted), umbrella stand (no depicted), or other similar structure and permit a pole-like structure (e.g., plant stem 110 as depicted in FIG. 1 or an umbrella pole) to protrude therethrough. In one embodiment, the least two substantially rigid body sections 102a-n may be of a wood material, while in other embodiments the least two substantially rigid body sections 102a-n may be of another substantially rigid material such as PVC, stainless steel, concrete, ceramic, etc. Said differently, the material of the body sections 102a-n should be of a rigidity sufficient to withstand normal compression and tensile forces (e.g., 5-10 lbf) without plastic deformation and/or failure. Said another way, the material of the body sections 102a-n may have an ultimate tensile strength of 50 MPa. The substantially rigid body sections 102a-n may also be beneficially shaped and ornamented as custom furniture, a feature found desirable by many users.

With reference to FIGS. 1-4, the least two substantially rigid body sections 102a-n (wherein "n" represents any number greater than 1) may include a rear sidewall 104, two opposing sidewalls 400a-b flanking and extending away from the rear sidewall 104 and having side terminal surfaces 402, 404, an upper wall 106 extending away from the rear sidewall 104 and having an upper wall side terminal surface 200 with a recessed portion 404 defined thereon and forming, with the side terminal surfaces 402, 404, a perimeter section surface 406. The rear sidewall 104, two opposing sidewalls 400a-b, and upper wall 106 may be disposed in substantially perpendicular (90°+/−15°) orientations and configurations with respect to one another (as shown) and may each have substantially planar surfaces the tops and bottoms of said walls to generate a safe and aesthetically pleasing appearance for the cover 100. In other embodiments, other configurations may be utilized, including more than two sections and other shapes and sizes for the sections. The at least two substantially rigid body sections 102a-n may also each have an upper end 112 and a lower end 408 opposing the upper end 112. As used herein, the term "wall" is intended broadly to encompass continuous structures, as well as, separate structures that are coupled together so as to form a substantially continuous external surface.

The at least two substantially rigid body sections 102a-n are beneficially operably configured to adjacently and removably couple together about their respective perimeter section surfaces 406 to form a substantially closed configuration (best seen in FIGS. 1-3) and to form a tightly-spaced joint between each of the respective perimeter section surfaces 406. The tightly-spaced joint may include direct abutting and contact of the perimeter section surfaces 406 and small slits or channels (that are discontinuous or continuous) less than approximately 25 mm. The tightly-spaced joint may preferably span from the lower end 408 to the upper end 408.

Figure 10:
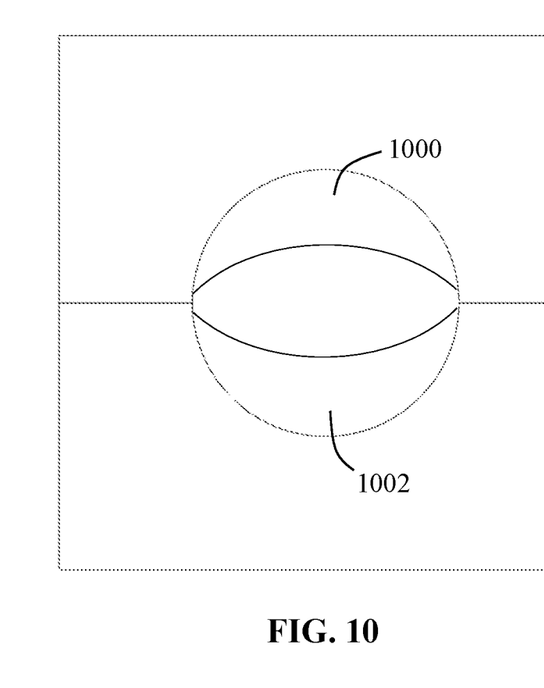
FIG. 10 is a top plan view of a plant and umbrella base cover with two opposing retention pads in accordance with one embodiment of the present invention.

When the body sections 102a-n are coupled together in the substantially closed configuration, they define a base covering cavity 412 enclosed by the rear sidewall 104 and two opposing sidewalls 400a-b of the base covering cavity 412. The upper walls 106 may also define the base covering cavity 412. The base covering cavity 412 is spatially coupled to an enclosed protrusion aperture 108 defined by recessed portions 404 defined by the upper walls 106 of the at least two substantially rigid body sections 102a-n. In one embodiment, as shown in FIG. 10, the upper walls 106 may each include a deformably resilient material or padding, e.g., neoprene, rubber, etc., coupled thereto (e.g., using adhesive) and which define the enclosed protrusion aperture 108. The pads 1000, 1002 may be operable to retain the upright structure in a desired orientation and provide further stability of the base and upright structure retained by the base. In one embodiment, the recessed portion 404 of each of the body sections 102a-b is of an arcuate shape and the enclosed protrusion aperture 108 forms a circular aperture defining a diameter ranging from approximately 25-250 mm, thereby providing a space sufficient to allow egress of the upright structure housed by the base.

Whether applied to a planter, umbrella, or other structure, the cover 100 is designed to fit around the plant or umbrella in order to cover it without having to manipulate or move the plant or umbrella. The cover 100 may generally be described as having two separate sections split down the middle. The cover 100 may have five sides leaving the bottom open. There is a hole centered on the top side to allow the umbrella or plant to come through. The portable base cover 100 is portable, i.e., capable of being moved around by a user without the use of auxiliary equipment and/or with minimal force, e.g., 1-2 lbf.

Figure 5:
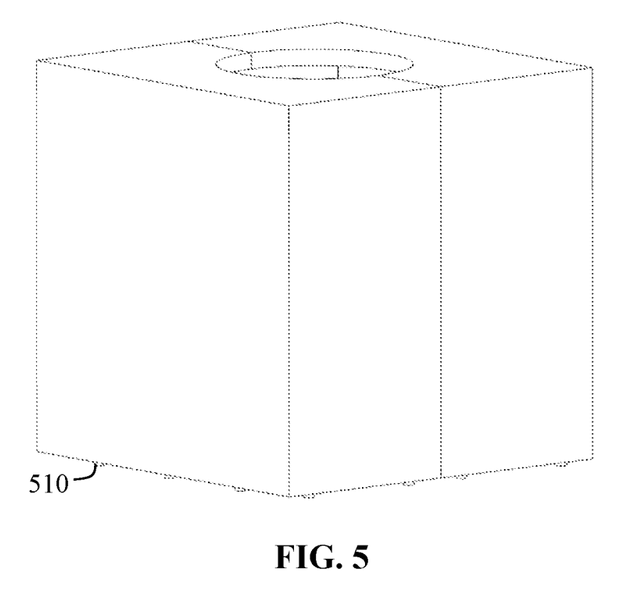
FIG. 5 is a perspective view of a plant and umbrella base cover with a plurality of legs in accordance with one embodiment of the present invention.
Figure 6:
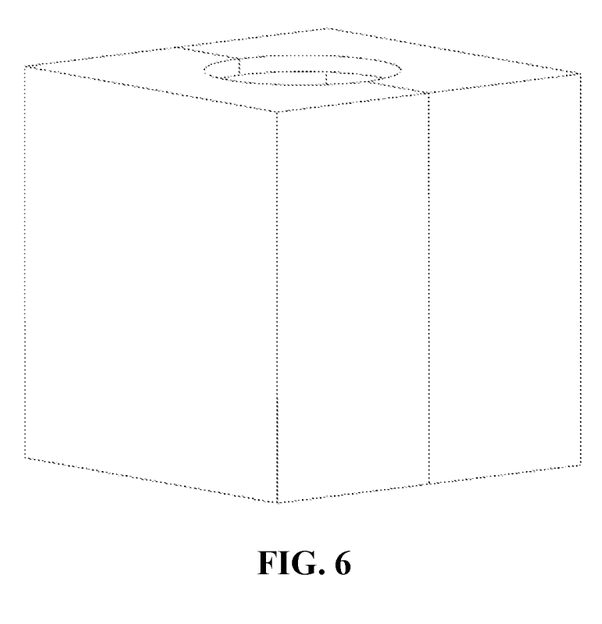
FIG. 6 is another perspective view of the base cover in FIG. 1.
Figure 7:
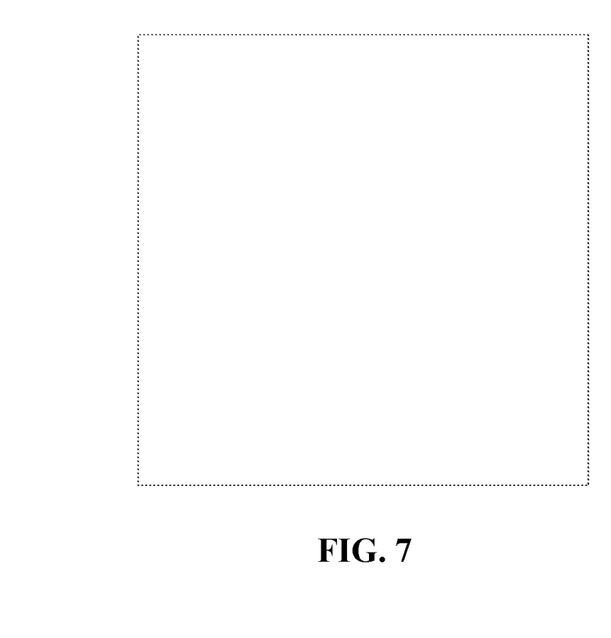
FIG. 7 is an elevational rear view (which is the same as the front view) of the base cover in FIG. 1.

In preferred embodiments, there is no lower wall included on the base cover 100, thereby enabling effective and efficient placement and removal of a planter base or other structure when desired by the user. In some embodiments, a lower wall (not shown, but which may extend from a lower terminal end of the rear wall) may be utilized and include an arcuate or other shape configured to receive a planter base (thereby preventing debris from falling onto the floor). If utilized, the lower wall may include a deformably resilient material (like the pads) disposed thereon to enable sufficient retention/coupling of the planter base without damaging the same. As seen best in FIG. 5, the lower end 408 (opposing the upper end 112) of the body sections 102*a-n* may include one or more supporting legs 510 configured to level the base cover 100.

Figure 3:
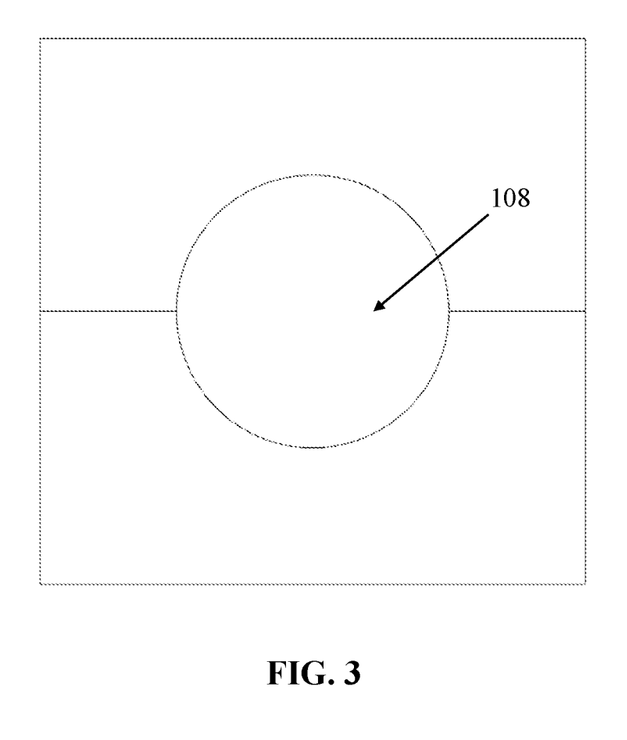
FIG. 3 is a top plan view of the base cover in FIG. 1.
Figure 4:
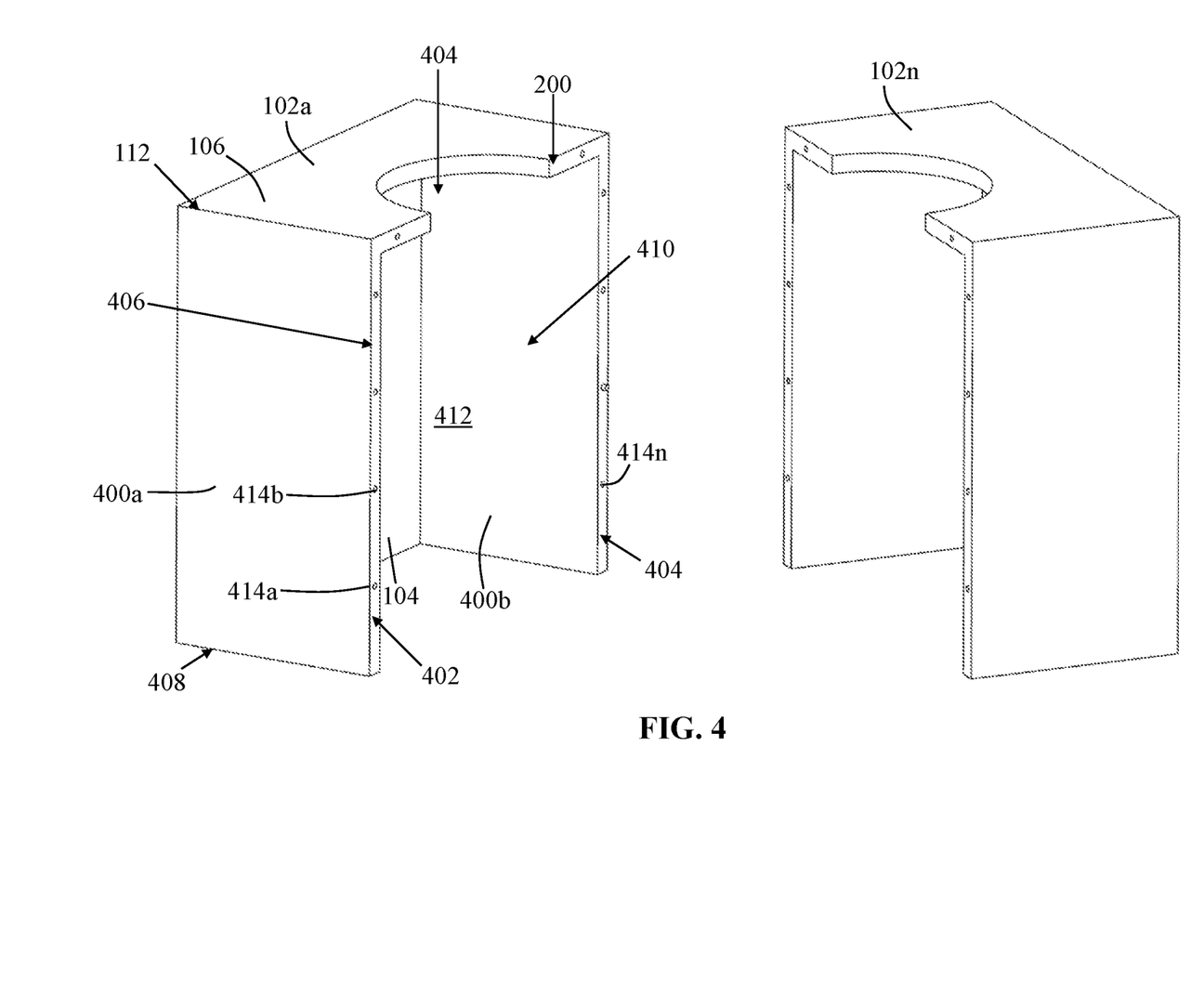
FIG. 4 is a perspective view of the base cover in FIG. 1 in an open or separated configuration in accordance with one embodiment of the present invention.
Figure 8:
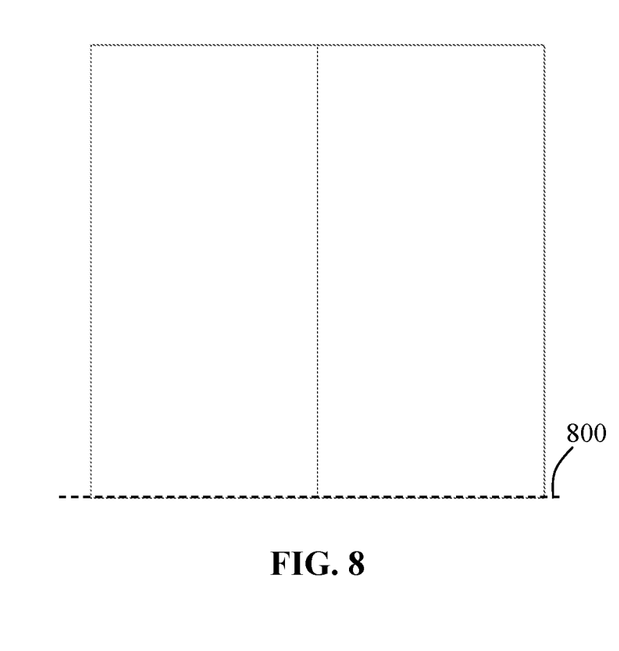
FIG. 8 is an elevational left side view (which is the same as the right side view) of the base cover in FIG. 1.
Figure 9:
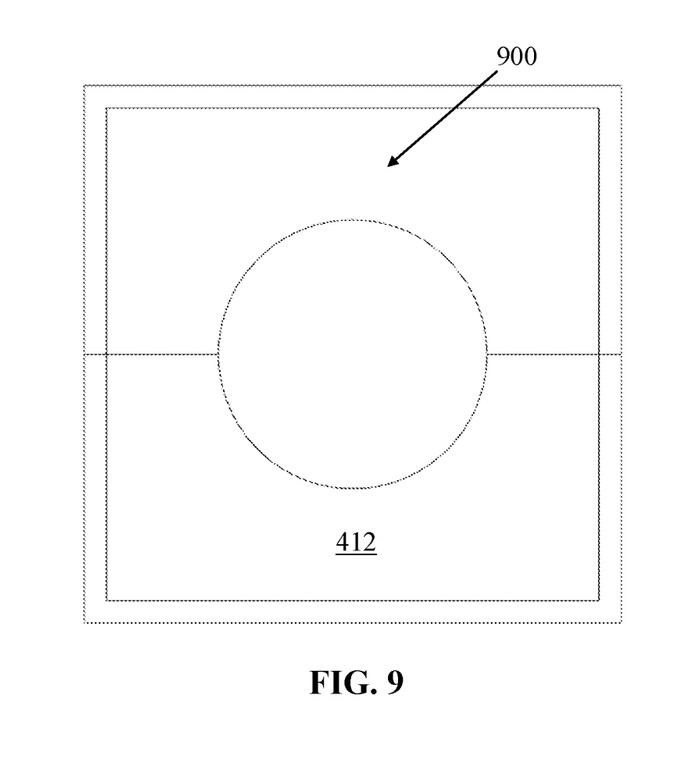
FIG. 9 is a bottom plan view of the base cover in FIG. 1.

In one embodiment, the rear sidewall 104, the two opposing sidewalls 400*a-b*, and the upper wall 106 of the least two substantially rigid body sections 102*a-n* are substantially planar. Furthermore, the rear sidewall 104 and the two opposing sidewalls 400*a-b* of the least two substantially rigid body sections 102*a-n* may define the lower end 408 and a lower support plane 800 (as best seen in FIG. 8). The rear sidewall 104 and the two opposing sidewalls 400*a-b* may also each include an inner surface 410 of a planar orientation spanning from an inner surface 900 of the upper wall 106 to the lower end 408, the inner surfaces 410 of the rear sidewall 104 and the two opposing sidewalls 400*a-b* defining the base covering cavity 412. Moreover, the rear sidewall 104 and the two opposing sidewalls 400*a-b* may each also include one or more leg(s) 510 coupled to the lower end 408 thereon, around the perimeter of the base covering 100 to define a lower support plane 800. As seen in FIGS. 3-4 and FIG. 8, the upper wall side terminal surfaces 200 that flank an opening to the recess portion 404 can be seen forming, with the side terminal surfaces 402, 404 a perimeter section surface 406, wherein the side terminal surfaces 402, 404 and the upper wall side terminal surfaces 200 can be seen as being coplanar with one another and the at least two substantially rigid body sections 102*a-n* are operably configured to adjacently and removably couple together about their respective perimeter section surfaces to form a substantially closed configuration with the two opposing sidewalls 400*a-b* on one of the at least two body sections 102*a-n* flush with a respective adjacent one of the two opposing sidewalls about their respective edges defining the respective perimeter section surface and the upper wall 106 on one of the at least two body sections 102*a-n* flush with an adjacent upper wall about their respective edges defining the respective perimeter section surface wall.

Beneficially, the at least two substantially rigid body sections 102*a-n* are operably configured to adjacently and removably couple together about their respective perimeter section surfaces 406 in a substantially closed configuration to form a base covering cavity 412 spatially coupled to an enclosed protrusion aperture 108. In one embodiment, the base covering cavity 412 may have internal dimensions of approximately 3'×3'×3' (length×width×height). Other internal dimensions may be utilized, however, based on design constraints and applications. The substantially closed configuration may include the perimeter section surface 406 of each of the body sections 102*a-n* abutting one another or defining a space (completely or partial) therein between the body sections 102*a-n*.

In one embodiment, the substantially closed configuration of the at least two substantially rigid body sections 102*a-n* includes one or more fastener(s) 414*a-n* operably coupled to one of the two opposing sidewalls 400*a-b* on both the at least two substantially rigid body sections 102*a-n* and one or more fastener(s) 414*a-n* operably coupled to another of the two opposing sidewalls 400*a-b* on both the at least two substantially rigid body sections 102*a-n*. Said another way, there may be one fastener (magnet, hook-and-loop, latch, etc.) coupling one side of the body sections 102*a-n* and another fastener coupling another opposing side of the body sections 102*a-n*.

In one embodiment, the at least two substantially rigid body sections 102*a-n* are selectively coupled (and uncoupled) together using a plurality of magnets 414*a-n*. More specifically, in one embodiment, a first plurality of magnets 414*a-n* may be disposed on one of the rigid body sections 102*a-n*, while a second plurality of magnets 414*a-n* may be disposed on another of the rigid body sections 102*a-n*. The first and second plurality of magnets 414*a-n* are of opposing polarities, thereby attracting one another and may have a pull force of approximately 2-10 lbf. The plurality of magnets 414*a-n* may also be strategically arranged on the perimeter section surface 406 to provide for retention on all walls and, in some embodiments, at equal intervals. In other embodiments, the body sections 102*a-n* may be selectively removably coupled together with one or more other fasteners, e.g., latches, Velcro, tongue-and-groove, etc. Said differently, a first plurality of magnets 414*a-n* may be coupled to the side terminal surfaces 402, 404 and the upper wall side terminal surface 200 of one of the at least two substantially rigid body sections 102*a-n* and a second plurality of magnets 414*a-n*, of an opposing polarity to a polarity of the first plurality of magnets 414*a-n*, coupled to the side terminal surfaces 402, 404 and the upper wall side terminal surface 200 of another of the at least two substantially rigid body sections 102*a-n*. The first and second plurality of magnets 414*a-n* are operably configured to magnetically retain the at least two substantially rigid body sections 102*a-n* in the substantially closed configuration.

In one embodiment of the present invention, the body sections 102*a-n* may include a hinge coupling them together on one side, thereby only requiring rotation of the one or more body sections 102*a-n* to provide for insertion and/or removal of the planter base. When the body sections 102*a-n* are closed, the enclosed protrusion aperture 108 provides sufficient space for the pole or stem to protrude therethrough in a safe and effective manner. In another embodiment of the present invention, one or more portions of the upper wall(s) defining the enclosed protrusion aperture 108 may include a deformably resilient material (e.g., rubber or neoprene) disposed thereon to enable sufficient retention/coupling of the stem or pole without damaging the same. In one embodiment, the enclosed protrusion aperture 108 formed with the sections 102*a-n* may be approximately 1-3 inches, while the enclosed protrusion aperture 108 may be of a varied diameter to accommodate the diameter of a pole, stem, or other object protruding therethrough.

Although a specific order of executing the process steps has been described and is depicted herein, the order of executing the steps may be changed relative to the order shown in certain embodiments. Also, two or more steps described as occurring in succession may be executed concurrently or with partial concurrence in some embodiments. Certain steps may also be omitted in for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A portable base cover comprising:
   at least two substantially rigid body sections each with an upper end, a lower end opposing the upper end, a rear sidewall, two opposing sidewalls flanking and extending away from the rear sidewall and having side terminal surfaces spanning from the lower end to the upper end, and an upper wall extending away from the rear sidewall, defining a recessed portion thereon, and having upper wall side terminal surfaces flanking an opening to the recess portion and forming, with the side terminal surfaces of the two opposing sidewalls, a perimeter section surface, the side terminal surfaces of each of the two opposing sidewalls and the upper wall side terminal surfaces for each of the at least two substantially rigid body sections are coplanar with one another and the at least two substantially rigid body sections operably configured to adjacently and removably couple together about their respective perimeter section surfaces to:
form a substantially closed configuration with the two opposing sidewalls on one of the at least two body sections flush with a respectively adjacent one of the two opposing sidewalls about their respective edges defining the respective perimeter section surface and with the upper wall on one of the at least two body sections flush with an adjacent upper wall about their respective edges defining the respective perimeter section surface;
form a tightly-spaced joint between each of the respective perimeter section surfaces spanning from the lower end to the upper end; and
define a base covering cavity enclosed by the rear sidewall and two opposing sidewalls of the at least two substantially rigid body sections and spatially coupled to an enclosed protrusion aperture defined by recessed portions defined by the upper walls of the at least two substantially rigid body sections.

2. The portable base cover according to claim 1, wherein:
the two opposing sidewalls and the upper wall extending away from the rear sidewall at a substantially perpendicular orientation.

3. The portable base cover according to claim 1, wherein:
the recessed portion is of an arcuate shape and the enclosed protrusion aperture forms a circular aperture defining a diameter ranging from approximately 25-250 mm.

4. The portable base cover according to claim 1, wherein the substantially closed configuration of the at least two substantially rigid body sections further comprises:
at least one fastener operably coupled to one of the two opposing sidewalls on both the at least two substantially rigid body sections and at least one fastener operably coupled to another of the two opposing sidewalls on both the at least two substantially rigid body sections.

5. The portable base cover according to claim 1, further comprising:
a first plurality of magnets coupled to the side terminal surfaces and the upper wall side terminal surface of one of the at least two substantially rigid body sections; and
a second plurality of magnets, of an opposing polarity to a polarity of the first plurality of magnets, coupled to the side terminal surfaces and the upper wall side terminal surface of another of the at least two substantially rigid body sections, the first and second plurality of magnets operably configured to magnetically retain the at least two substantially rigid body sections in the substantially closed configuration.

6. The portable base cover according to claim 1, wherein:
the rear sidewall, the two opposing sidewalls, and the upper wall of the least two substantially rigid body sections are substantially planar.

7. The portable base cover according to claim 6, wherein:
the rear sidewall and the two opposing sidewalls of the least two substantially rigid body sections define the lower end and a lower support plane.

8. The portable base cover according to claim 7, wherein the rear sidewall and the two opposing sidewalls each further comprise:
an inner surface of a planar orientation spanning from an inner surface of the upper wall to the lower end, the inner surfaces of the rear sidewall and the two opposing sidewalls defining the base covering cavity.

9. The portable base cover according to claim 1, wherein the rear sidewall and the two opposing sidewalls each further comprise:
at least one leg coupled to the lower end thereon and defining a lower support plane.

10. A portable base cover comprising:
a first substantially rigid body section with an upper end, a lower end opposing the upper end, a rear sidewall, two opposing sidewalls flanking and extending away from the rear sidewall and having side terminal surfaces spanning from the lower end to the upper end of the first substantially rigid body section and each with a magnet coupled thereto, and with an upper wall extending away from the rear sidewall, defining a recess portion thereon, and having upper wall side terminal surfaces flanking an opening to the recess portion and forming, with the side terminal surfaces of the two opposing sidewalls of the first substantially rigid body section, a perimeter section surface, wherein the side terminal surfaces and the upper wall side terminal surfaces of the first substantially rigid body section are coplanar with one another; and
a second substantially rigid body section with an upper end, a lower end opposing the upper end, a rear sidewall, two opposing sidewalls flanking and extending away from the rear sidewall of the second body section and having side terminal surfaces spanning from the lower end of the second substantially rigid body section to the upper end of the substantially rigid body section and each with a magnet coupled thereto and of an opposing polarity to the magnets coupled to the side terminal surfaces of the two opposing sidewalls of the first body section, and with an upper wall extending away from the rear sidewall and having, defining a recess portion thereon, upper wall side terminal surfaces flanking an opening to the recess portion thereon and forming, with the side terminal surfaces of the second substantially rigid body section, a perimeter section surface, wherein the side terminal surfaces and the upper wall side terminal surfaces of the second substantially rigid body section are coplanar with one another and the first and second body sections are operably configured to adjacently and removably couple together about their respective perimeter section surfaces to:
form a substantially closed configuration with the first and second body sections magnetically retained together and with the two opposing sidewalls on the first substantially rigid body section each flush with an adjacent one of the two opposing sidewalls about their respective edges defining the respective perimeter section surface and with the upper wall on the first substantially rigid body section flush with an adjacent upper wall about their respective edges defining the respective perimeter section surface;

define a base covering cavity enclosed by the rear sidewall and two opposing sidewalls of the first and second substantially rigid body sections and spatially coupled to an enclosed protrusion aperture defined by recessed portions defined by the upper walls of the first and second substantially rigid body sections.

11. The portable base cover according to claim 10, wherein:
the substantially closed configuration includes the first and second body sections operably configured to adjacently and removably couple together about their respective perimeter section surfaces to form a tightly-spaced joint between each of the respective perimeter section surfaces spanning from the lower end to the upper end.

12. The portable base cover according to claim 10, wherein:
the two opposing sidewalls and the upper wall of the first and second body sections extend away from the rear sidewall on the respective first and second body sections at a substantially perpendicular orientation.

13. The portable base cover according to claim 10, wherein:
the recessed portion is of an arcuate shape and the enclosed protrusion aperture forms a circular aperture defining a diameter ranging from approximately 25-250 mm.

14. The portable base cover according to claim 10, further comprising:
a first plurality of magnets coupled to each of the upper wall side terminal surfaces of the first body section; and
a second plurality of magnets, of an opposing polarity to a polarity of the first plurality of magnets, coupled to the upper wall side terminal surfaces of the second body section, the first and second plurality of magnets operably configured to magnetically retain the at least two substantially rigid body sections in the substantially closed configuration.

15. The portable base cover according to claim 10, wherein:
the rear sidewall, the two opposing sidewalls, and the upper wall of the first and second body sections are substantially planar.

16. The portable base cover according to claim 15, wherein:
the rear sidewall and the two opposing sidewalls of the first and second body sections define the lower end and a lower support plane.

17. The plant and umbrella base cover according to claim 16, wherein the rear sidewall and the two opposing sidewalls each further comprise:
an inner surface of a planar orientation spanning from an inner surface of the upper wall to the lower end, the inner surfaces of the rear sidewall and the two opposing sidewalls defining the base covering cavity.

* * * * *